US012328088B2

(12) United States Patent
Islam et al.

(10) Patent No.: US 12,328,088 B2
(45) Date of Patent: Jun. 10, 2025

(54) PULSED CONTROL OF MULTIPLE ELECTRIC MACHINES

(71) Applicant: Tula eTechnology, Inc., San Jose, CA (US)

(72) Inventors: Zakirul Islam, San Jose, CA (US); Vijay Srinivasan, Farmington Hills, MI (US)

(73) Assignee: Tula eTechnology, Inc., San Jose, CA (US)

( * ) Notice: Subject to any disclaimer, the term of this patent is extended or adjusted under 35 U.S.C. 154(b) by 193 days.

(21) Appl. No.: 17/963,069

(22) Filed: Oct. 10, 2022

(65) Prior Publication Data

US 2023/0114289 A1     Apr. 13, 2023

Related U.S. Application Data

(60) Provisional application No. 63/254,333, filed on Oct. 11, 2021.

(51) Int. Cl.
    *H02P 5/74*        (2006.01)
(52) U.S. Cl.
    CPC ...................... *H02P 5/74* (2013.01)
(58) Field of Classification Search
    CPC ........................................................ H02P 5/74
    USPC ............................................................ 318/53
    See application file for complete search history.

(56) References Cited

U.S. PATENT DOCUMENTS

| 4,441,043 A | 4/1984 | Decesare |
| 4,989,146 A | 1/1991 | Imajo |
| 5,099,410 A | 3/1992 | Divan |
| 5,151,637 A | 9/1992 | Takada et al. |

(Continued)

FOREIGN PATENT DOCUMENTS

| CN | 1829070 A | 9/2006 |
| CN | 102381265 A | 3/2012 |

(Continued)

OTHER PUBLICATIONS

International Search Report and Written Opinion from International Application No. PCT/US2022/046198 dated Feb. 3, 2023.

(Continued)

*Primary Examiner* — Kawing Chan
(74) *Attorney, Agent, or Firm* — Beyer Law Group LLP

(57) ABSTRACT

A variety of methods, controllers, and electric machine systems are described that facilitate pulsed control of multiple electric machines (e.g., electric motors and generators) to improve the machine's energy conversion efficiency. Under selected operating conditions, the electric machine is intermittently driven (pulsed). The pulsed operation causes the output of the electric machine to alternate between a first output level and a second output level that is lower than the first output level. The output levels are selected such that at least one of the electric machines and a system that includes the electric machine has a higher energy conversion efficiency during the pulsed operation than the electric machine would have when operated at a third output level that would be required to drive the electric machine in a continuous manner to deliver the desired output. In some embodiments, the second output level is zero torque.

29 Claims, 9 Drawing Sheets

(56) References Cited

U.S. PATENT DOCUMENTS

| | | | |
|---|---|---|---|
| 5,325,028 | A | 6/1994 | Davis |
| 5,483,141 | A | 1/1996 | Uesugi |
| 5,640,073 | A | 6/1997 | Ikeda et al. |
| 5,731,669 | A | 3/1998 | Shimizu et al. |
| 6,291,960 | B1 | 9/2001 | Crombez |
| 6,308,123 | B1 | 10/2001 | Ikegaya et al. |
| 6,370,049 | B1 | 4/2002 | Heikkila |
| 6,424,799 | B1 | 7/2002 | Gilmore |
| 6,493,204 | B1 | 12/2002 | Glidden et al. |
| 6,605,912 | B1 | 8/2003 | Bharadwaj et al. |
| 6,829,515 | B2 | 12/2004 | Grimm |
| 6,829,556 | B2 | 12/2004 | Kumar |
| 6,906,485 | B2 | 6/2005 | Hussein |
| 6,940,239 | B2 | 9/2005 | Iwanaga et al. |
| 6,984,946 | B2 * | 1/2006 | Donnelly .................. B60L 9/02 318/52 |
| 7,190,143 | B2 | 3/2007 | Wei et al. |
| 7,259,664 | B1 | 8/2007 | Cho et al. |
| 7,327,545 | B2 | 2/2008 | Konishi |
| 7,411,801 | B2 | 8/2008 | Welchko et al. |
| 7,453,174 | B1 | 11/2008 | Kalsi |
| 7,558,655 | B2 | 7/2009 | Garg et al. |
| 7,577,511 | B1 | 8/2009 | Tripathi et al. |
| 7,616,466 | B2 | 11/2009 | Chakrabarti et al. |
| 7,768,170 | B2 | 8/2010 | Tatematsu et al. |
| 7,852,029 | B2 | 12/2010 | Kato et al. |
| 7,960,888 | B2 | 6/2011 | Ai et al. |
| 7,969,341 | B2 | 6/2011 | Robbe et al. |
| 8,020,651 | B2 | 9/2011 | Zillmer et al. |
| 8,099,224 | B2 | 1/2012 | Tripathi et al. |
| 8,768,563 | B2 | 7/2014 | Nitzberg et al. |
| 8,773,063 | B2 | 7/2014 | Nakata |
| 9,046,559 | B2 | 6/2015 | Lindsay et al. |
| 9,050,894 | B2 | 6/2015 | Banerjee et al. |
| 9,308,822 | B2 | 4/2016 | Matsuda |
| 9,495,814 | B2 | 11/2016 | Ramesh |
| 9,512,794 | B2 | 12/2016 | Serrano et al. |
| 9,630,614 | B1 | 4/2017 | Hill et al. |
| 9,702,420 | B2 | 7/2017 | Yoon |
| 9,758,044 | B2 | 9/2017 | Gale et al. |
| 9,948,173 | B1 | 4/2018 | Abu Qahouq |
| 10,060,368 | B2 | 8/2018 | Pirjaberi et al. |
| 10,081,255 | B2 | 9/2018 | Yamada et al. |
| 10,256,680 | B2 | 4/2019 | Hunstable |
| 10,273,894 | B2 | 4/2019 | Tripathi |
| 10,291,168 | B2 | 5/2019 | Fukuta |
| 10,291,174 | B2 | 5/2019 | Irie et al. |
| 10,320,249 | B2 | 6/2019 | Okamoto et al. |
| 10,344,692 | B2 | 7/2019 | Nagashima et al. |
| 10,381,968 | B2 | 8/2019 | Agirman |
| 10,476,421 | B1 | 11/2019 | Khalil et al. |
| 10,550,776 | B1 | 2/2020 | Leone et al. |
| 10,742,155 | B2 | 8/2020 | Tripathi |
| 10,944,352 | B2 | 3/2021 | Mazda et al. |
| 11,077,759 | B1 | 8/2021 | Srinivasan |
| 11,088,644 | B1 | 8/2021 | Carvell |
| 11,133,763 | B1 | 9/2021 | Islam |
| 11,133,767 | B2 | 9/2021 | Serrano et al. |
| 11,167,648 | B1 | 11/2021 | Carvell et al. |
| 11,228,272 | B2 | 1/2022 | Tripathi |
| 11,427,177 | B2 | 8/2022 | Serrano et al. |
| 11,623,529 | B2 | 4/2023 | Carvell et al. |
| 11,626,827 | B2 | 4/2023 | Tripathi |
| 11,628,730 | B2 | 4/2023 | Srinivasan |
| 11,695,361 | B2 | 7/2023 | Carvell et al. |
| 11,863,096 | B2 | 1/2024 | Carvell |
| 11,973,447 | B2 | 4/2024 | Chen |
| 12,003,202 | B2 | 6/2024 | Tripathi |
| 2001/0039926 | A1 | 11/2001 | Kobayashi et al. |
| 2002/0043954 | A1 | 4/2002 | Hallidy et al. |
| 2005/0127861 | A1 | 6/2005 | McMillan et al. |
| 2005/0151437 | A1 | 7/2005 | Ramu |
| 2005/0160771 | A1 | 7/2005 | Hosoito et al. |
| 2007/0216345 | A1 | 9/2007 | Kanamori |
| 2007/0287594 | A1 | 12/2007 | DeGeorge et al. |
| 2008/0129243 | A1 | 6/2008 | Nashiki |
| 2008/0179980 | A1 | 7/2008 | Dawsey et al. |
| 2009/0045691 | A1 | 2/2009 | Ichiyama |
| 2009/0121669 | A1 | 5/2009 | Hanada |
| 2009/0128072 | A1 | 5/2009 | Strong et al. |
| 2009/0146615 | A1 | 6/2009 | Zillmer et al. |
| 2009/0179608 | A1 | 7/2009 | Welchko et al. |
| 2009/0306841 | A1 | 12/2009 | Miwa et al. |
| 2010/0010724 | A1 | 1/2010 | Tripathi et al. |
| 2010/0201294 | A1 | 8/2010 | Yuuki et al. |
| 2010/0296671 | A1 | 11/2010 | Khoury et al. |
| 2011/0029179 | A1 | 2/2011 | Miyazaki et al. |
| 2011/0089774 | A1 | 4/2011 | Kramer |
| 2011/0101812 | A1 | 5/2011 | Finkle et al. |
| 2011/0130916 | A1 | 6/2011 | Mayer |
| 2011/0208405 | A1 | 8/2011 | Tripathi et al. |
| 2012/0056569 | A1 | 3/2012 | Takamatsu et al. |
| 2012/0112674 | A1 | 5/2012 | Schulz et al. |
| 2012/0169263 | A1 | 7/2012 | Gallegos-Lopez et al. |
| 2012/0217921 | A1 | 8/2012 | Wu et al. |
| 2013/0134912 | A1 | 5/2013 | Khalil et al. |
| 2013/0141027 | A1 | 6/2013 | Nakata |
| 2013/0226420 | A1 | 8/2013 | Pedlar et al. |
| 2013/0241445 | A1 | 9/2013 | Tang |
| 2013/0258734 | A1 | 10/2013 | Nakano et al. |
| 2014/0018988 | A1 | 1/2014 | Kitano et al. |
| 2014/0028225 | A1 | 1/2014 | Takamatsu et al. |
| 2014/0130506 | A1 | 5/2014 | Gale et al. |
| 2014/0176034 | A1 | 6/2014 | Matsumura et al. |
| 2014/0217940 | A1 | 8/2014 | Kawamura |
| 2014/0265957 | A1 | 9/2014 | Hu et al. |
| 2014/0292382 | A1 | 10/2014 | Ogawa et al. |
| 2014/0354199 | A1 | 12/2014 | Zeng et al. |
| 2014/0375232 | A1 | 12/2014 | Findeisen et al. |
| 2015/0025725 | A1 | 1/2015 | Uchida |
| 2015/0240404 | A1 | 8/2015 | Kim et al. |
| 2015/0246685 | A1 | 9/2015 | Dixon et al. |
| 2015/0261422 | A1 | 9/2015 | Den et al. |
| 2015/0297824 | A1 | 10/2015 | Cabiri et al. |
| 2015/0318803 | A1 | 11/2015 | Wu et al. |
| 2016/0094163 | A1 * | 3/2016 | Takahashi ............... H02P 5/74 318/400.06 |
| 2016/0114830 | A1 | 4/2016 | Dixon et al. |
| 2016/0226409 | A1 | 8/2016 | Ogawa |
| 2016/0233812 | A1 | 8/2016 | Lee et al. |
| 2016/0269225 | A1 | 9/2016 | Kirchmeier et al. |
| 2016/0373047 | A1 | 12/2016 | Loken et al. |
| 2017/0087990 | A1 | 3/2017 | Neti et al. |
| 2017/0163108 | A1 | 6/2017 | Schencke et al. |
| 2017/0331402 | A1 | 11/2017 | Smith et al. |
| 2018/0032047 | A1 | 2/2018 | Nishizono et al. |
| 2018/0045771 | A1 | 2/2018 | Kim et al. |
| 2018/0154786 | A1 | 6/2018 | Wang et al. |
| 2018/0276913 | A1 | 9/2018 | Garcia et al. |
| 2018/0323665 | A1 | 11/2018 | Chen et al. |
| 2018/0334038 | A1 | 11/2018 | Zhao et al. |
| 2019/0058374 | A1 | 2/2019 | Enomoto et al. |
| 2019/0267919 | A1 | 8/2019 | Suzuki et al. |
| 2019/0288629 | A1 * | 9/2019 | Tripathi ................ H03M 3/456 |
| 2019/0288631 | A1 | 9/2019 | Tripathi |
| 2019/0341820 | A1 | 11/2019 | Krizan et al. |
| 2020/0212834 | A1 | 7/2020 | Mazda et al. |
| 2020/0262398 | A1 | 8/2020 | Sato et al. |
| 2020/0328714 | A1 | 10/2020 | Tripathi |
| 2020/0343849 | A1 | 10/2020 | Coroban-Schramel |
| 2020/0366223 | A1 | 11/2020 | Coroban-Schramel |
| 2021/0146909 | A1 | 5/2021 | Serrano et al. |
| 2021/0203263 | A1 | 7/2021 | Serrano et al. |
| 2021/0351733 | A1 | 11/2021 | Carvell |
| 2023/0219426 | A1 | 7/2023 | Carvell et al. |
| 2023/0223885 | A1 | 7/2023 | Tripathi |
| 2023/0253911 | A1 | 8/2023 | Islam |
| 2023/0308040 | A1 | 9/2023 | Farah et al. |
| 2024/0022191 | A1 | 1/2024 | Phillips et al. |
| 2024/0022199 | A1 | 1/2024 | Phillips et al. |
| 2024/0022200 | A1 | 1/2024 | Phillips et al. |
| 2024/0063735 | A1 | 2/2024 | Islam et al. |
| 2024/0063744 | A1 | 2/2024 | Islam et al. |
| 2024/0063745 | A1 | 2/2024 | Parsels et al. |

(56) References Cited

U.S. PATENT DOCUMENTS

| | | |
|---|---|---|
| 2024/0088806 A1 | 3/2024 | Carvell et al. |
| 2024/0136968 A1 | 4/2024 | Mazda |
| 2024/0291410 A1 | 8/2024 | Carvell et al. |
| 2024/0291416 A1 | 8/2024 | Tripathi |

FOREIGN PATENT DOCUMENTS

| | | | |
|---|---|---|---|
| CN | 104716754 | A | 6/2015 |
| CN | 204589885 | U | 8/2015 |
| CN | 105196877 | A | 12/2015 |
| CN | 205229379 | U | 5/2016 |
| CN | 106932208 | A | 7/2017 |
| CN | 107067780 | A | 8/2017 |
| CN | 207129052 | U | 3/2018 |
| CN | 108216026 | A | 6/2018 |
| CN | 108445386 | A | 8/2018 |
| CN | 110212725 | | 9/2019 |
| DE | 102014206342 | | 10/2015 |
| EP | 2605398 | A1 | 6/2013 |
| FR | 2989479 | | 10/2013 |
| GB | 2273212 | | 8/1994 |
| JP | H05153705 | | 6/1993 |
| JP | 10014287 | | 1/1998 |
| JP | 10243680 | | 9/1998 |
| JP | 2006-121844 | | 5/2006 |
| JP | 2008-079686 | A | 4/2008 |
| JP | 2009-065758 | A | 3/2009 |
| JP | 2009-247205 | | 10/2009 |
| JP | 2011-67043 | | 3/2011 |
| JP | 2012-228134 | | 11/2012 |
| JP | 5165660 | B2 | 12/2012 |
| JP | 2014-033449 | A | 2/2014 |
| JP | 2015-006063 | | 1/2015 |
| JP | 5857472 | B2 | 12/2015 |
| JP | 2017-011970 | A | 1/2017 |
| JP | 2017-200382 | | 11/2017 |
| JP | 2018-033250 | A | 3/2018 |
| JP | 2020048254 | | 3/2020 |
| KR | 10-2017-0021146 | A | 2/2017 |
| KR | 10-2017-0032976 | A | 3/2017 |
| WO | WO03/36787 | A1 | 5/2003 |
| WO | WO2012-010993 | A2 | 1/2012 |

OTHER PUBLICATIONS

Cai et al., "Torque Ripple Reduction for Switched Reluctance Motor with Optimized PWM Control Strategy", https://www.mdpi.com/1996-1073/11/11/3215, Oct. 15, 2018, 27 pages.

Spong et al., "Feedback Linearizing Control of Switched Reluctance Motors", IEEE Transactions on Automatic Control, vol. AC-32, No. 5, May 1987, pp. 371-379.

Mirzaeva et al., "The use of Feedback Quantizer PWM for Shaping Inverter Noise Spectrum", Power Electronics and Motion Control COnference (EPE/PEMC), 2012 15th International IEEE, Sep. 4, 2012, pp. DS3c.10-1, XP032311951, DOI: 10.1109/EPEPEMC. 2012.6397346, ISBN: 978-1-4673-1970.6.

Luckjiff et al., "Hexagonal ΣΔ Modulators in Power Electronics", IEEE Transactions on Power Electronics, Institute of Electrical and Electronics Engineers, USA, vol. 20, No. 5, Sep. 1, 2005, pp. 1075-1083, XP011138680, ISSN: 0885-8993, DOI: 10.1109/TPEL. 2005.854029.

Ramsey, "How This Father and Son's New Electric Turbine Could Revolutionize Electric Cars; Huntstable Electric Turbine can Produce up to Three Times the Torque of Any Other Motor", https://www.parsintl.com/publication/autoblog/, Mar. 8, 2020.

Srinivasan, U.S. Appl. No. 17/158,230, filed Jan. 26, 2021.

Carvell, U.S. Appl. No. 18/630,634, filed Apr. 9, 2024.

\* cited by examiner

PULSED CONTROL OF MULTIPLE ELECTRIC MACHINES

CROSS-REFERENCE TO RELATED APPLICATION

This application claims the benefit of priority of U.S. Application No. 63/254,333, filed Oct. 11, 2021, which is incorporated herein by reference for all purposes.

BACKGROUND

The present application relates generally to multiple electric machine control. More specifically, control schemes and controller designs are described that pulse the operation of two or more electric machines during selected operating conditions to facilitate operating the electric machines in a more energy efficient manner.

The phrase "electric machine" as used herein is intended to be broadly construed to mean both electric motors and generators. Electric motors and generators are structurally very similar. When an electric machine is operating as a motor, it converts electrical energy into mechanical energy. When operating as a generator, the electric machine converts mechanical energy into electrical energy.

Electric motors and generators are used in a very wide variety of applications and under a wide variety of operating conditions. In general, many modern electric machines have relatively high energy conversion efficiencies. However, the energy conversion efficiency of most electric machines can vary considerably based on their operational load. With respect to systems using multiple electrical machines, the efficiency of multi-motor drives is often very crucial considering their application in range sensitive applications such as electrical vehicles (EVs), drones, or the like. Furthermore, many applications require that the electric machine operates under a wide variety of different operating load conditions, which means that the electric machine often doesn't operate as efficiently as it is capable of. Accordingly, a need, therefore, exists to operate electric machines, such as motors and generators, at higher levels of efficiency.

SUMMARY

A variety of methods, controllers, and electric machine systems are described that facilitate pulsed control of a multiple electric machine (e.g., electric motors and generators) drive system to improve the energy conversion efficiency of the electric machines when operating conditions warrant. More specifically, under selected operating conditions, one or more of electric machines in a multiple electric machine drive system are driven in a pulsed (e.g. intermittently driven) mode or continuous mode based on optimizing efficiency and performance of the drive system as a whole.

One aspect is a multi-machine torque modulation method that may be incorporated into a control algorithm for the operation of a variety of electric machines or motors. The method evaluates, based on a given input, which electric machines, or combination of electric machines, are running, how much load they share, and whether one or more of the electric machines run under torque modulation (pulsing) to maximize system efficiency. In one embodiment, such evaluation or determination may be based on one or more of: 1) operating speed and demanded torque; 2) loss characteristics of individual electric machines; and (3) noise, vibration, and harshness (NVH), temperature, thermal balance or other characteristics of the electric machines.

In another embodiment, the pulsing of each motor in a multi-motor drive system is phased in such a manner so as to increase the frequency of pulsation to improve motor characteristics such as smoothness of torque delivery and minimizing noise, vibration, and harshness (NVH). In such a configuration, each of the individual motors pulses at a lower frequency for better efficiency gains, but as a result of the motor phasing the overall system with multiple motors has a higher frequency excitation (low NVH) due to the phasing control.

Multi-machine torque modulation techniques may be implemented to achieve the highest possible system efficiency in a multi-motor drive system, significantly reduce rare-earth magnet composition, maintain thermal balance, and lessen NVH, torque ripple, or other characteristics of the electric machines.

BRIEF DESCRIPTION OF THE DRAWINGS

The technology described herein and the advantages thereof may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

Figure 1:
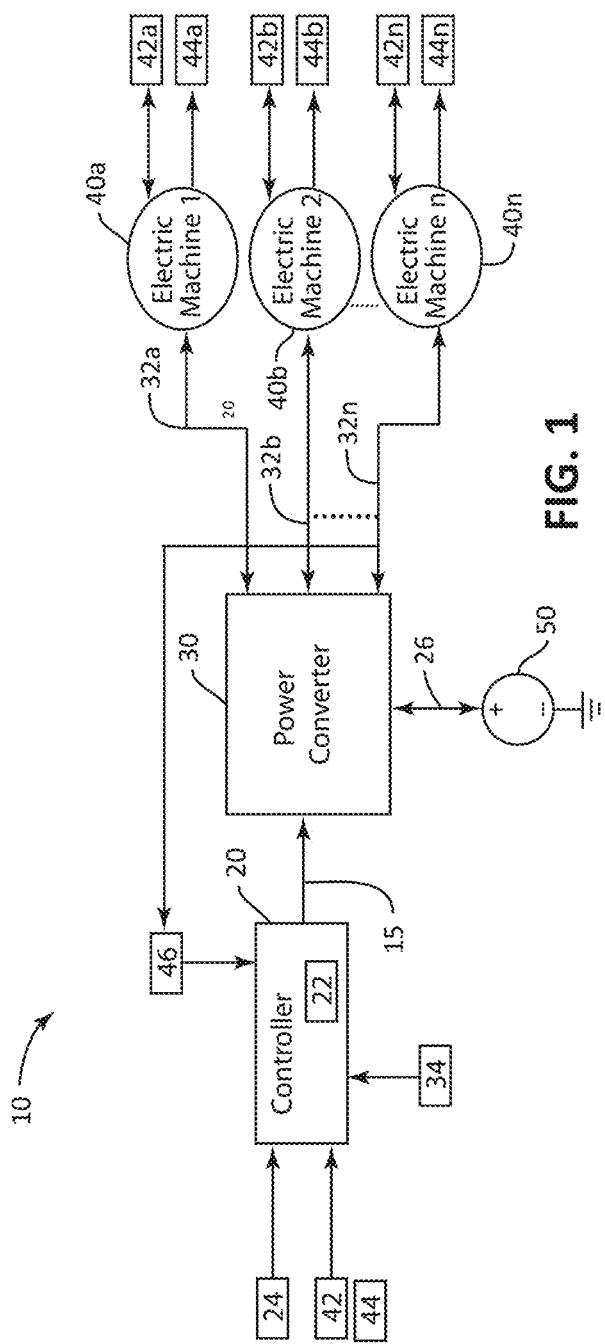
FIG. 1 is a functional block diagram illustrating a multiple electric machine control architecture in accordance with a non-exclusive embodiment of the present description.

The present disclosure relates generally to pulsed control of multiple electric machine drive systems (e.g., electric motors and generators) that would otherwise be operated in a continuous manner to improve the energy conversion efficiency of the electric machine when operating conditions warrant.

More specifically, under selected operating conditions, one or more of the electric machines in a multiple electric machine drive system are intermittently driven (i.e. pulsed). One such pulsing operation comprises dynamic motor drive (DMD), which uses a pulse-density control scheme that operates the electric machine intermittently at a torque which has the maximum efficiency given a requested motor torque demand Exemplary DMD systems and methods may be implemented, including those systems and methods disclosed in U.S. Pat. No. 11,133,763 issued on Sep. 28, 2021, U.S. Pat. No. 10,742,155 filed on Mar. 14, 2019, U.S. Pat. No. 10,944,352 filed on Mar. 13, 2020, U.S. patent application Ser. No. 16/912,313 filed on Jun. 25, 2020, and U.S. patent application Ser. No. 17/166,646 filed on Feb. 3, 2021, all of which are incorporated by reference in their entirety.

In one embodiment, the pulsed operation of the electric machine causes the output of the electric machine to alternate between a first output level and a second output level that is lower than the first output level. The first and second output levels are selected such that at least one of the electric machines and a system that includes the electric machine has a higher energy conversion efficiency during the pulsed operation than the electric machine would have when operated at a third output level that would be required to drive the electric machine in a continuous manner to deliver the desired output. In some embodiments, the second output level is zero torque (or substantially zero torque). In some embodiments, the pulsed operation may further include at least one intermediate output level between the first output level and the second output level, where the alternating between the first output level and the second output level provides operation at the at least one intermediate output level.

In some embodiments, the electric machine is driven in a pulsed manner when a desired output is less than a designated output level for a given motor operating speed and driven in a continuous manner when the desired motor output is greater than or equal to the designated output level.

The present disclosure relates generally to pulsed control of electric machines (e.g., electric motors and generators) that would otherwise be operated in a continuous manner to improve the energy conversion efficiency of the electric machine when operating conditions warrant. More specifically, under selected operating conditions, an electric machine is intermittently driven (pulsed) at more efficient energy conversion operating levels to deliver a desired average torque more energy efficiently than would be attained by traditional continuous motor control.

Many types of electrical machines, including mechanically commutated machines, electronically commutated machines, externally commutated asynchronous machines, and externally commutated synchronous machines are traditionally driven by a continuous, albeit potentially varying, drive current when the machine is used as a motor to deliver a desired torque output. The drive current is frequently controlled by controlling the output voltage of a power converter (e.g., an inverter) which serves as the voltage input to the motor. Conversely, the power output of many types of generators is controlled by controlling the strength of a magnetic field—which may, for example, be accomplished by controlling an excitation current supplied to rotor coils by an exciter. (The exciter may be part of a rectifier or other suitable component). Regardless of the type of machine, the drive current for a motor, or the current output by a generator, tends to be continuous.

With pulsed control, the output of the machine is intelligently and intermittently modulated between "torque on" and "zero (no) torque" states in a manner that: (1) meets operational demands, while (2) improving overall efficiency. Stated differently, under selected operating conditions, the electric machine is intermittently driven at a more efficient energy conversion operating level (the "torque on" state) to deliver a desired output. In the periods between the pulses, the machine ideally does not generate or consume any torque (the "zero torque" state). This can conceptually be thought of as turning the electric machine "off." In some implementations, this can be accomplished by effectively turning the electric machine "off," for example, by shutting off the drive current to a motor or the excitation current for a generator. However, in other implementations, the electric machine may be controlled during the "zero torque" state in a manner that attempts to cause the torque generated by the electric machine to be zero or as close to zero as may be practical or appropriate for the particular machine. In some implementations, any power converters used in conjunction with the electric machine may effectively be turned off for at least portions of the "zero torque" periods as well.

FIG. 1 illustrates a functional block diagram of a multiple electric machine control system 10 in accordance with a non-exclusive embodiment of the present technology. In this embodiment, the system 10 includes a controller 20, a power supply/sink 50, a power converter 30, and a plurality of electric machines (e.g. Machine 1 (40a), Machine 2 (40b) 40b . . . Machine n (40n). Controller 20 may include a machine controller, pulse controller, or other control logic or circuitry either as a single control unit or multiple control modules.

When the electric machines 40a-40n are operated as motors, the controller 20 functions as a motor controller, and sends a command 15 to the power converter 30 for converting power 26 received from power supply 50 to a form that is suitable for driving the electric machines 40a-40n. In such configuration, power converter 30 (acting as an inverter) provides input power 32a, 32b through 32n to respective electric machines 40a, 40b, through 40n. In some embodiments, electric machines 40a-40n comprise 3-phase electric motors, and power signals 32a, 32b through 32n comprise conventional sinusoidal three-phase input. Command 15 is configured to drive electric machines 40a-40n to collectively or individually operate in a state of continuous or pulsing modes of operation, as provided in further detail below. During the pulsed operating modes, the output of the machine is pulsed on and off, and the controller 20 may direct the power converter to turn off during at least portions of the times that the electric machine is pulsed off. The dedicated lines depicting the various possible power/control signals, e.g. 32a, 32b, up to 32n are shown with arrows on both ends indicating that current can flow both from the power converter 30 to the electric machines 40a-40n when the machine is used as a motor and that current can flow from the electric machines 40a-40n to the power converter 30 when the machine is used as a generator. When the electric machines 40a-40n are operated as a generator, the controller 20 functions as a generator controller and the power converter 30 converts power received from the generator to a form suitable for delivery to the power sink 50.

It is appreciated that the control system 10 and controller 20 may be implemented to control a plurality of electric machines. For example, for embodiments employed in motor vehicles, the control system 10 may be configured to operate 2 motors the drive shafts (not shown) of which may be coupled to the wheels in various configurations. For example, in a dual (2) motor design, one motor may be dedicated to drive the front wheels, while a second motor is dedicated to the rear wheels. Alternatively, both motors could be coupled to the same drive (e.g. both dedicated to rear-wheel drive or front-wheel drive). In another embodiment, each motor could be coupled to a dedicated wheel (e.g. left rear wheel and right rear wheel in a dual motor drive, or each of the vehicle's 4 wheels in a 4-motor configuration). Other, (e.g. non-vehicular) applications may be also considered. For example, the control system 10 and controller 20 may be implemented for operating a drone, with each motor being designated to drive one or more of the drone propellers (e.g. in 4, 6, or 8 propeller configurations). It is appreciated that the above embodiments are detailed for illustrative purposes only and that the systems and methods of the presented technology may be applied across a number of different applications, as well as motor and drive configurations.

In embodiments in which the power supply/sink 50 can supply or receive power directly in the form required by or outputted by the electric machines 40a-40n, the power converter 30 can conceptually take the form of a switch or logical multiplier that simply turns the motor on and off to facilitate operation of the electric machines 40a-40n.

The power supply/sink 50 can take any suitable form. In some implementations, the power supply/sink 50 may take the form of a battery or a capacitor. In other implementations, the power supply/sink 50 may be a power grid (e.g., "wall power"), a photovoltaic system, or any other available source. Similarly, the sink may be an electrical load (such as an electrically operated machine or appliance, a building, a factory, a home, etc.), a power grid, or any other system that uses or stores electrical power.

The power converter 30 can also take a wide variety of different forms. When the power supply/sink 50 is a DC power supply and the electric machines 40a-40n comprise AC motors, the power converter 30 can take the form of an inverter. Conversely, when the power supply/sink 50 is a DC power sink and the electric machines 40a-40n comprise AC generators, the power converter 30 can take the form of a rectifier. When both the power supply/sink 50 and the electric machine are AC components, the power converter 30 may include a bidirectional or 4 quadrant power converter.

In FIG. 1, the requested output or demand 24 (also referred to herein as "torque request"), along with motor/generator operating speed 44, torque delivered 42, and other inputs 46 may be input and/or provide feedback to the controller 20. In some embodiments, the controller 20 includes application programming 22 that is stored in memory (not shown) and executable on a processor (not shown) to provide pulsed-operation coordination, timing, and/or other signal processing of one or more aspects of the current/signals to each of the electric machines 40a, 40b, through 40n such that the electric machines 40a, 40b, through 40n operate at optimal efficiency and other performance characteristics or parameters.

As seen in FIG. 1, the controller 20 is configured to receive input of a torque delivered or received by the electric machines 40a-40n to provide feedback for the system 10. This feedback may be in the form of a total cumulative torque delivered 42 of all electric machines 40a-40n, and/or the individual torque delivered 42a, 42b, through 42n for each of the electric machines 40a, 40b, through 40n respectively. Feedback to controller 20 may also be in the form of data from speed measurements (e.g. rotor speed 44 of all electric machines 40a-40n, and/or the individual shaft speed 44a, 44b, through 44n for each of the electric machines 40a, 40b, through 40n respectively). Further feedback 46 may comprise motor phase, current I, and/or voltage V. Further input may include one or more comparative devices such as lookup tables 34 that provide data relating to efficiency or other parameters/characteristics over a portion or entirety of the operating range of the electric machines 40a, 40b, through 40n. While the description below details lookup tables as one form of input 34, it is appreciated that such functionality may be achieved via non-tabular means such as equations, simulations, or other routines or algorithms available in the art. It is also appreciated that in some embodiments, the rotor speed for the various motors may be different, and that motors may be coupled to gears with differing gear ratios.

Figure 2:
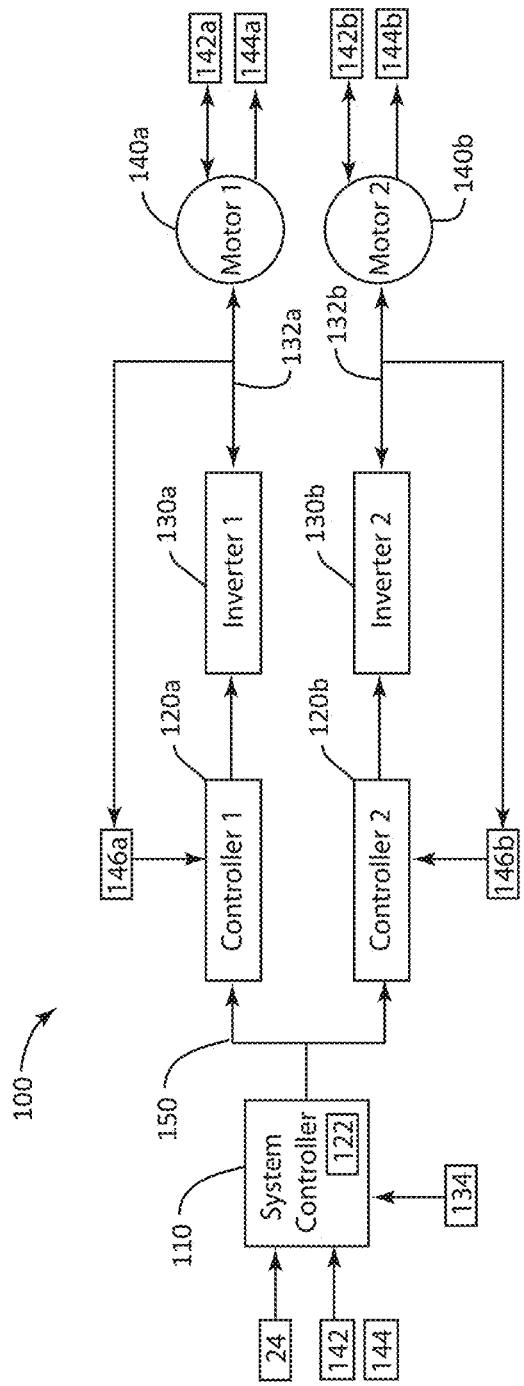
FIG. 2 is a functional block diagram illustrating a specific embodiment of a multiple electric machine control architecture for a dual-motor design.

FIG. 2 is a functional block diagram illustrating a specific embodiment of a control architecture or system 100 for a dual-motor drive system. Control system 100 comprises a system controller 110 configured to send control command 150 to operate a pair of electric motors, namely Motor 1 (140a) and Motor 2 (140b). In FIG. 2, the torque request 24, along with motor/generator speed 144, torque delivered 142, and other inputs such as lookup tables 134 may be input and/or provide feedback to the system controller 110. In some embodiments, the system controller 110 includes application programming 122 that is stored in memory (not shown) and executable on a processor (not shown) to provide pulsed-operation coordination, timing, and/or other signal processing of one or more aspects of the current/signals to each of the electric motors 140a, 140b, such that the electric motors 140a, 140b operate at optimal efficiency and other performance characteristics or parameters. In the embodiment shown in FIG. 2, the system controller sends commands 150 to dedicated Motor Controller 1 (120a) and Motor Controller 2 (120b) and corresponding Inverter 1 (130a) and Inverter 2 (130b). Inverter 1 (130a) and Inverter 2 (130b) makeup one or more power converters coupled to Motor 1 (140a) and Motor 2 (140b). The inverters 130a and 130b then send current/voltage 132a and 132b to respective motors 140a and 140b. It is appreciated that system controller 110 may be configured for operating any number of motors, and may also include logic and/or programming to integrate motor controllers 120a, 120b and system controller 110 into a single controller or module. Command signals may include information and/or signals dictating whether the motors 140a and 140b are operated continuously, in pulsed mode, or other operating mode or signal characteristic (e.g. amplitude, phase, timing, etc.). It is also appreciated that a single inverter may be used in place of the dual inverter configuration of FIG. 2.

As also seen in FIG. 2, the controller 110 is configured to receive input of a torque delivered or received by the motors 140a and 140b to provide feedback for the system 100. This feedback may be in the form of a total cumulative torque delivered 142 for both motors 140a and 140b, and/or the individual torque delivered 142a, 142b, for each of the electric motors 140a and 140b, respectively. Feedback to system controller 110 may also be in the form of data from speed measurements (e.g. cumulative or drive shaft speed 144 of all electric motors 140a and 140b, and/or the individual shaft speed 144a, 144b for each of the electric motors 140a and 140b respectively). Further input may include one or more lookup tables 134 that provide data relating to efficiency or other parameters/characteristics over a portion or entirety of the operating range of the electric motors 140a and 140b. Feedback 146a and 146b (e.g. motor phase, current I, and/or voltage V) may be input to motor controllers 120a and 120b, respectively, and/or provided to the system controller 110.

Figure 3:
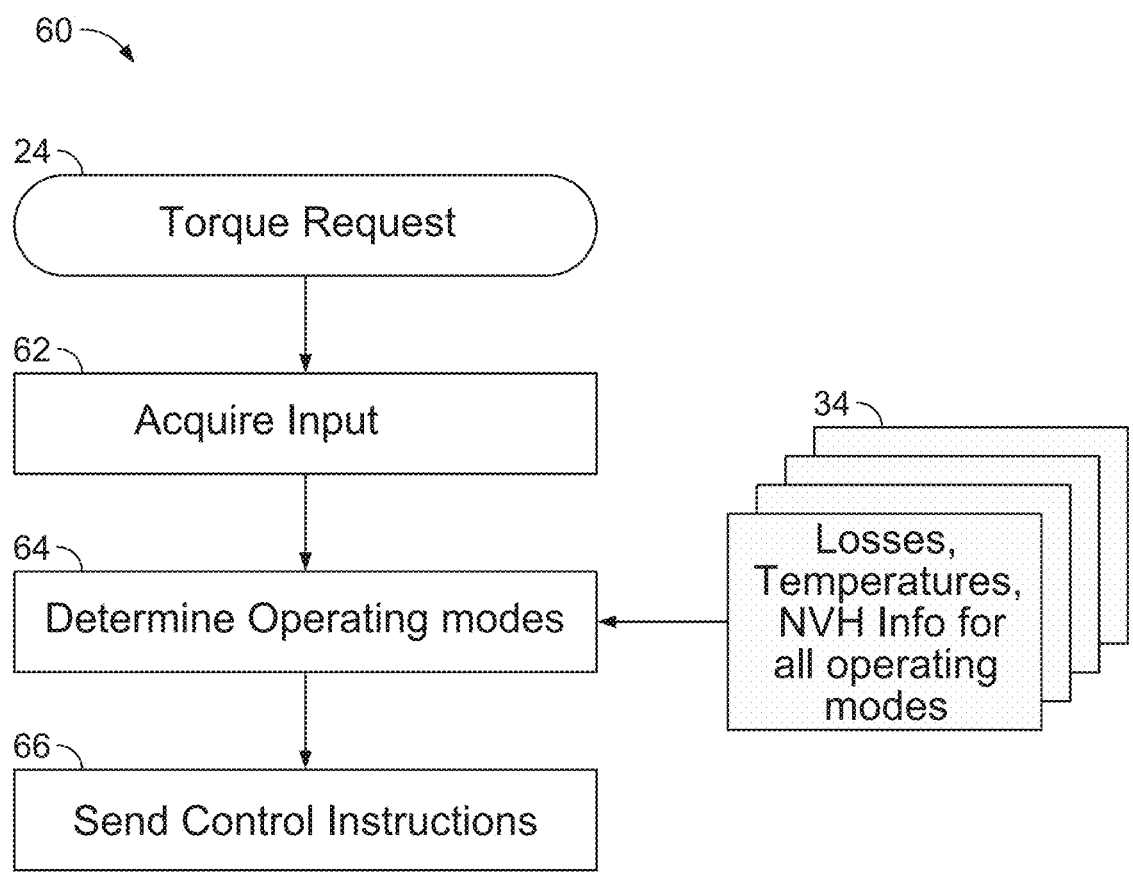
FIG. 3 is a high-level flow chart illustrating a multiple electric machine control scheme in accordance with an embodiment.

FIG. 3 shows a flow chart illustrating a multiple electric machine control method 60 in accordance with an embodiment. Method 60 may be implemented as application programming 22 of controller 20 of FIG. 1 or application programming 122 of the system controller 110 for the operation of multiple electric machine/motor drive systems. First, input is acquired at step 62. Input will generally include the requested torque 24, or any of the other feedback data (e.g. motor speed 44, output torque 42, etc.). Based on the input 24 and one or more lookup tables 34, a determination is made at step 64 to identify which mode to operate the electric machines/motors. Exemplary lookup tables 34 include operating mode scenarios for machine/motor characteristics and/or conditions, such as loss data, thermal data, noise, vibration and harshness (NVH) data, efficiency data, etc. In addition, the exemplary lookup tables 34 include operating mode scenarios for other system component characteristics and/or conditions, such as the power source/sink 50, that impact the overall drive system efficiency and/or losses. The performance and/or losses of some system components, such as the power source/sink 50, depend on the combined output of all electric machines 40*a*-40*n* as reflected in the total demand from the power converter 30. Table 3 shows an exemplary operating mode scheme for use in a dual-motor drive system similar to the control system 110 detailed in FIG. 2. Table 3 shows 4 operating modes for two motors (Motor 1 and Motor 2). However, it is appreciated that the operating modes shown in Table 3 may include any number of operating modes and be similarly implemented in the system of FIG. 1 and on a variety of electric machines in addition to the configuration shown in FIG. 2. For example, additional configurations may include an Operating Mode 0 where both motors are off. Similarly, an additional mode of "Motor 1 pulsed output, Motor 2 off" (i.e. Mode 2a may be included).

TABLE 3

Operating modes for dual motor drive configuration

| Operating Mode | Operating Parameters |
|---|---|
| 1 | Continuous operation (output) of both motors (if on) |
| 2 | Motor 1 pulsed output; Motor 2 continuous output |
| 3 | Motor 2 in pulsed output; Motor 1 continuous output |
| 4 | Motor 1 and Motor 2 both operating in pulsed output |

In Operating Mode 1, normal operation conditions are implemented, i.e., one or both Motor 1 and Motor 2 are operating in continuous (non-pulsing) mode. Neither Motor 1 nor Motor 2 operates in DMD (pulsed) mode. This mode is generally selected where the required input energy in normal operation is less than that required for DMD operation, or if a DMD mode generates unacceptable performance levels according to an operating characteristic of the motor or motors (e.g. NVH level, thermal balance, losses, etc.) as compared to any or both of the motors running conventionally or following a typical torque split technique. In some embodiments, input data of losses comprises total losses relating to one or more motors, converters, or battery/power sources.

In Operating Mode 2, Motor 1 is run in a DMD (pulsed) operating mode, and Motor 2 is run in a conventional (continuous) operating mode or is off. Similarly in Operating Mode 3, Motor 2 is run in a DMD (pulsed) operating mode, and Motor 1 is run in a conventional (continuous) operating mode or is off. In either Operating Mode 1, Operating Mode 2, or Operating Mode 3, these modes are selected if system loss for the combination is minimized (or minimum) and performance characteristics (e.g. NVH level) are acceptable.

In Operating Mode 4, both Motor 1 and Motor 2 are run in a DMD (pulsed) operating mode. As with Mode 2 and Mode 3, Operating Mode 4 is selected if system loss for the combination is minimized and performance characteristics (e.g. NVH level) are acceptable. In this mode, the timing or frequency of the pulsed operation (e.g. modulation or on/off frequency) may be configured such that the motors are operated so that on or off periods (or portions thereof) are out of phase, or other complimentary timing configurations. For example, if two motors are being pulsed/operated at a modulation frequency of 10 hz, the timing of the motor pulsing may be coordinated (e.g. out of phase) such that the frequencies are additive, i.e. the combination of motors results in an effective fundamental or system frequency of 20 Hz on the vehicle body, a frequency that may be less perceptible to the operator. Such phase timing may be used to mitigate or lessen an unacceptable vibration or torque pulsation (torque ripple), thus providing torque smoothing to the operation of the motors. DMD pulsing at higher frequencies can be inefficient compared to lower frequency pulsation due to the transition losses with each pulse. However, Vehicle NVH is more sensitive to lower frequencies. Vehicle structures and human bodies can be very sensitive to frequencies in the 0.5-20 Hz range. Thus, out of phase timing of the multiple motors may achieve "the best of both worlds," i.e., the efficiency of 10 Hz DMD with the NVH of 20 Hz torque pulses. In some embodiments, phase timing is performed to minimize the torque oscillations at 1×, 2×, and 3× the fundamental frequency.

In another embodiment, a table of phase angles as a function of frequency for each motor is provided for applications where a simple 180 degree phase difference may not achieve perfect cancellation at the desired location (such as the driver's seat or another operator interface) due to the transfer functions from each motor's torque output to the vibration at the target location. For example, if electric machine 1 has a phase delay of 0 at the driver's seat at 20 Hz, but electric machine 2 has a phase delay of 90 deg at the same location, then to minimize vibration, electric machine 2 is commanded to only add 90 degrees of phase to add up to a total of 180 including the transfer function. This will be a function of the frequency response of the vehicle/other application.

Phase command could also be calculated from a vibration response model OR real-time system identification using the inverter as a shaker OR real-time feedback controllers using vibration/other sensor, as will be discussed in more detail below.

Figure 6A:
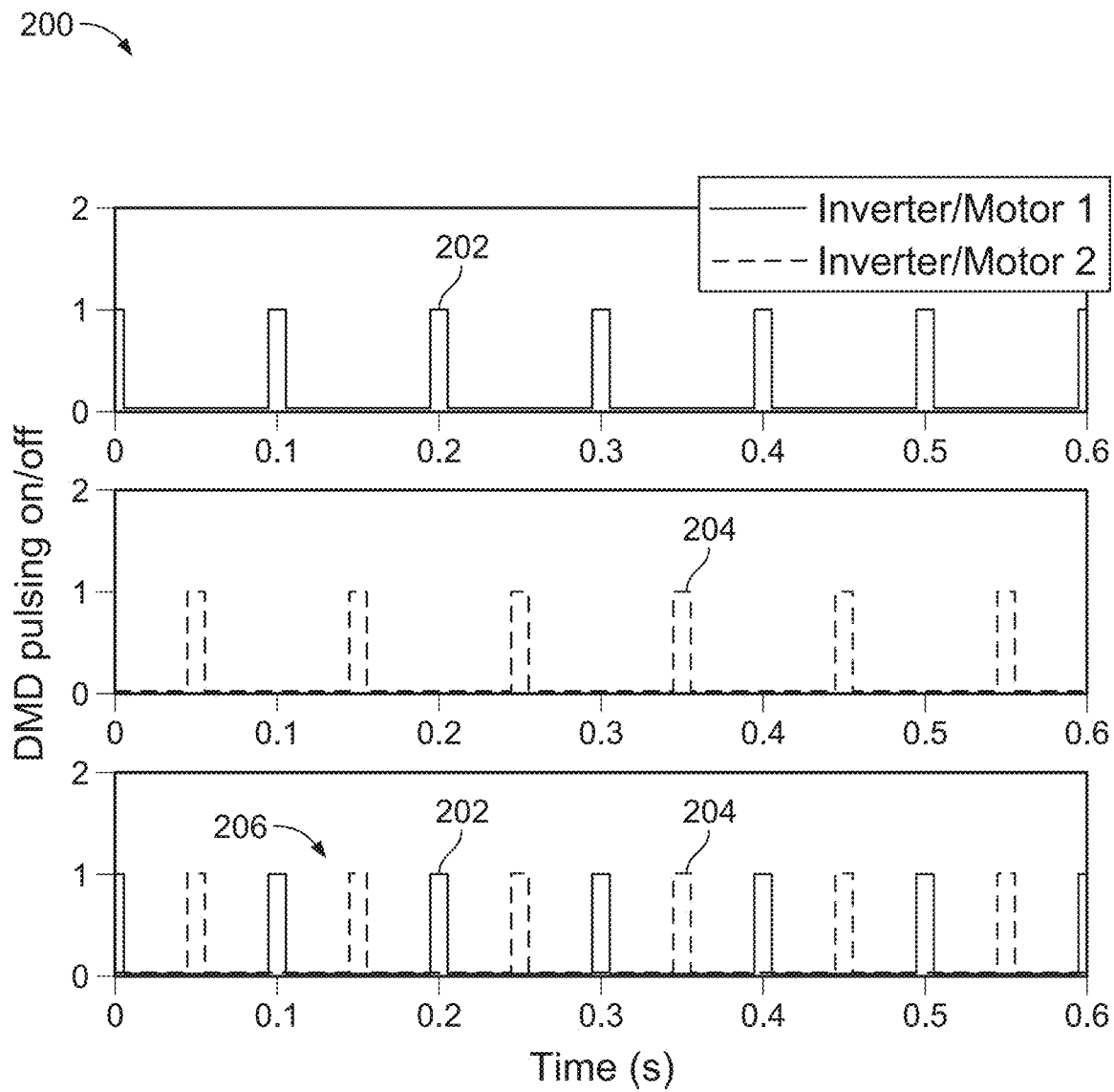
FIGS. 6A and 6B show exemplary motor pulsing schemes for two motors operating in pulsed mode at 10 Hz out of phase with each other.
Figure 6B:
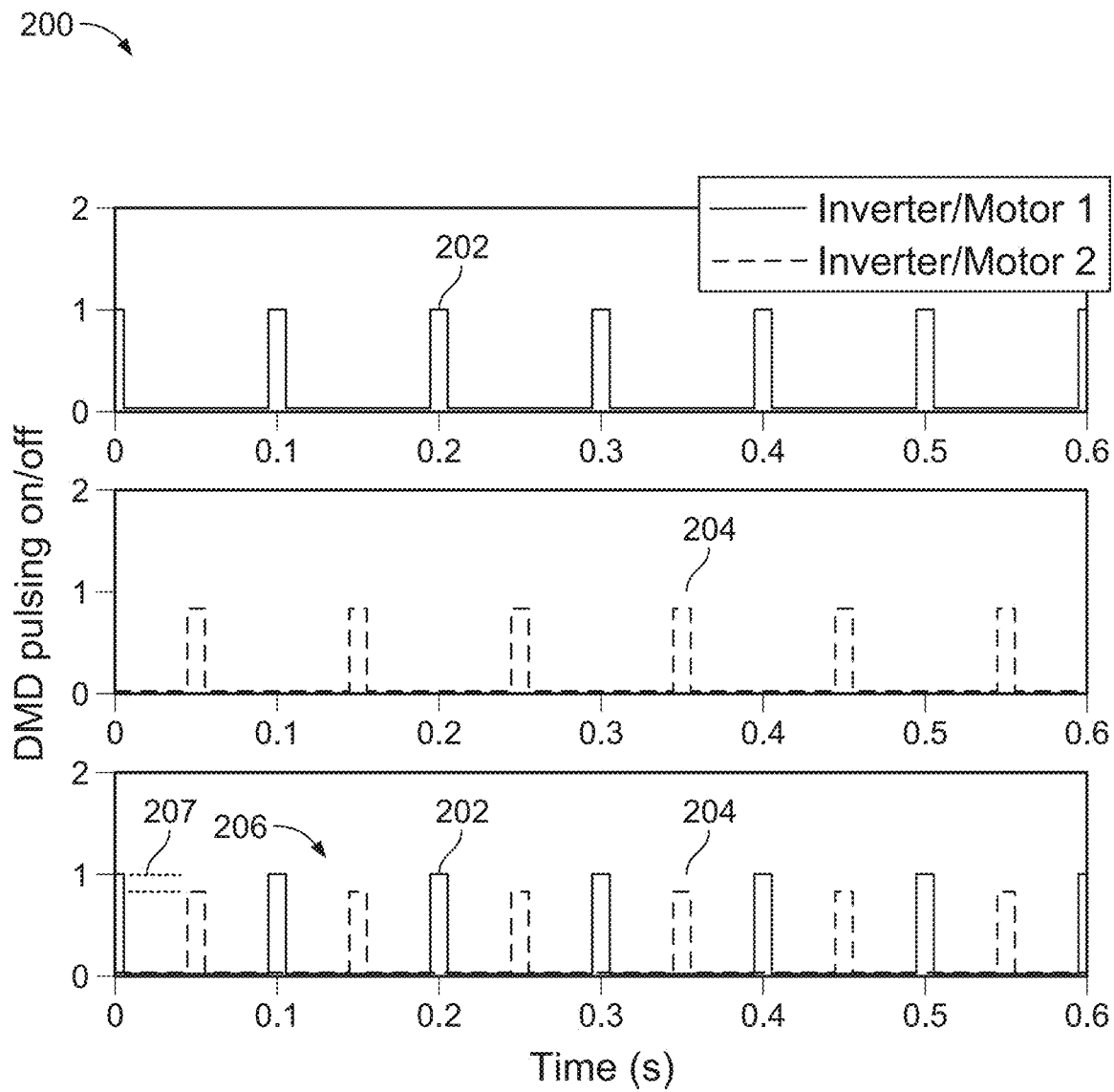

FIG. 6A shows an exemplary motor pulsing scheme 200 for two motors operating DMD at 10 Hz out of phase with each other, with an effective fundamental frequency of 20 Hz exciting the vehicle body. When Motor 1 is pulsed to "off", Motor 2 will be pulsed to "on" to fill the center of the torque hole created by Motor 1's deactivation. In the examples shown in FIGS. 6A and 6B, Motor 1 and Motor 2 are individually pulsing at 10 Hz (signals 202 and 204, respectively) at equal amplitudes, but the combined waveform 206 has a fundamental of 20 Hz (assuming both motors are identical, same duty cycle, 50:50 torque split). This is an ideal scenario where the troublesome 10 Hz excitation is canceled while each motor still enjoys the full efficiency benefits of pulsing at 10 Hz. This effectively doubles the frequency of excitation. FIG. 6B illustrates an embodiment where the amplitude of the pulses for Motor 1 is different from the amplitude of Motor 2, where the difference in amplitude is shown by dotted lines 207. The difference in amplitude may be a result of the differences between Motor 1 and Motor 2. In some embodiments, the duty cycle for Motor 1 may be different than the duty cycle of Motor 2. The difference in duty cycle may be a result of the difference between Motor 1 and Motor 2.

Figure 7A:
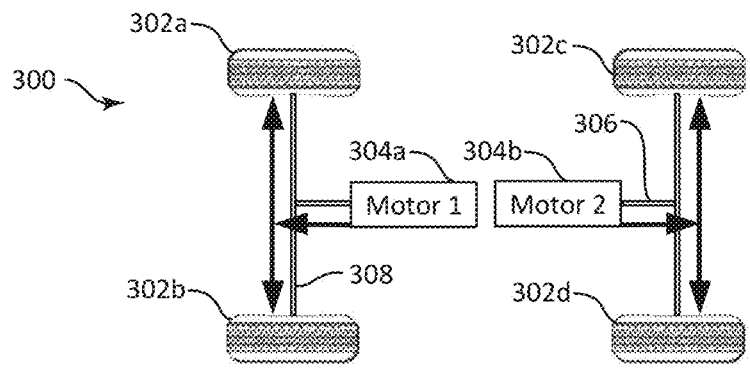
FIG. 7A through FIG. 7C illustrate various multi-motor drive configurations that may be used in accordance with the systems and methods of the presented technology.
Figure 7B:
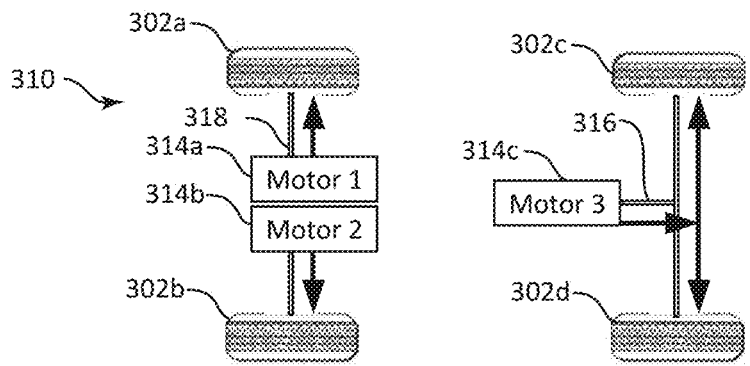
Figure 7C:
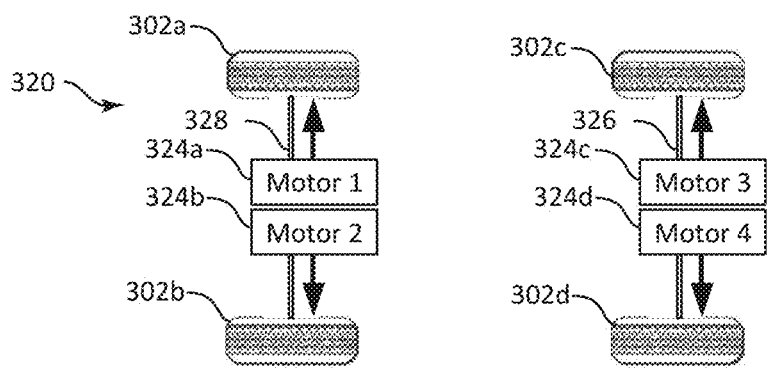

FIG. 7A through FIG. 7C illustrate various multi-motor drive configurations that may be used in accordance with the systems and methods of the presented technology. FIG. 7A shows an exemplary dual-motor drive train 300, comprising a Motor 1 (304a) configured to operate rear wheel drive 308 (wheels 302a and 302b) and Motor 2 (304b) configured to operate front wheel drive 306 (wheels 302c and 302d). In one configuration, the motor pulsing scheme 200 may be implemented on the dual motor configuration 300 of FIG. 7A. FIG. 7B shows an exemplary tri-motor drive train 310 comprising a Motor 1 (314a) and Motor 2 (314b) configured to operate respective wheels 302a and 302b of rear wheel drive 318 and Motor 3 (314c) configured to operate front wheel drive 316 (wheels 302c and 302d). FIG. 7C shows an exemplary quad-motor drive train 320 comprising Motor 1 (324a) and Motor 2 (324b) configured to operate respective wheels 302a and 302b of rear wheel drive 328 and Motor 3 (324c) and Motor 4 (324d) configured to operate respective wheels 302c and 302d to operate front wheel drive 326.

The torques being produced by each of the motors do not necessarily need to be the same. If there is a biased power split (by design) in the torque production between the front and rear motors, the system still works, but the fundamental frequency does not get completely canceled but is significantly weakened. This is still good for NVH and enables lower frequency operation than without the system. By extension, the DMD pulsing duty cycles do not have to match between the two (or more) motors for the mitigating effect.

The phase timing principles above may also be employed further to drive systems having three, four, or more motors. For example, the tri-motor configuration 310 of FIG. 7B may have a phase timing such that the torque pulses are staggered with phase differences of 120° from each other at the fundamental pulsing frequency, thus tripling the fundamental frequency. In another tri-motor embodiment, the pulses of two of the three motors may be in phase with each other, while the third motor is 180° out of phase.

Furthermore, the quad-motor configuration 320 of FIG. 7C may have a phase timing such that the torque pulses are staggered with phase differences of 90° from the prior motor's pulse at the fundamental pulsing frequency, thus quadrupling the fundamental frequency. In such configuration, the 4 motors may be individually driving each of the wheels of a vehicle, achieving a 40 Hz torque delivery to the vehicle even with each motor pulsing at only 10 Hz. In another 4-motor system, the 4 motors may be split into two groups (e.g. 1/3 or 2/2) where motors within the same group pulse in phase with one another but are phased 180° apart from motors in the other group, In a further embodiment, the 4 motors are split into three groups (e.g. 1/1/2) where the phasing follows the three motor system described above.

For a three, four, or more-motor system, the decision to group or not group the motors for phasing purposes may be dictated by the physical layout of the motors in the application (e.g., group by front/rear motors in a vehicle), the frequency of pulsing of each motor, and the NVH response of the system, or other factors.

If the vehicle's dynamic characteristics do not allow for left/right phasing, then the front and rear motors may be grouped for phasing purposes such that the front two motors pulse in unison and the rear ones pulse out of phase with the front, resulting in merely doubling the fundamental frequency. The decision to group or individually phase each motor in a multi-motor configuration may depend on the particular vehicle characteristic or driving mode.

The motors may also be operated at the same pulsing frequency or at different pulsing frequencies. Assuming there are n-number of motors, each can be controlled separately. Broadly, those motors can be running in a torque modulation or pulsing mode with n-number of torque modulation frequencies. For example, the first motor can be at zero torque modulation (no-DMD, normal operation), the second one operating at DMD with a torque modulation frequency of $f_1$, the third motor at a frequency of $f_2$, and so on. However, in many cases, based on different factors such as NVH, beats, and complexity of control, there may ideally be one DMD frequency at a certain operating time. So, some of the motors will be running in no-DMD mode, others will be running in DMD mode with a certain torque modulation frequency of $f_1$. In such embodiment, there can still be phase shifting between the modulating currents for the motors running in DMD mode.

Once the operating mode is determined at step 64 (FIG. 3), control instructions or commands (e.g. commands 15, 150) are then sent at step 66 to the motors to operate in a continuous or pulsed manner according to the selected mode.

It is appreciated that Motor 1 and Motor 2, and any additional motors used in the drive system, may be specifically configured to be similar or vary according to different design considerations. For example, Motor 1 may be configured to operate most efficiently at a higher torque or speed range than Motor 2 or may be in a different class. For example, Motor 1 may be an interior permanent magnet motor, while Motor 2 is a synchronous reluctance motor.

Figure 8:
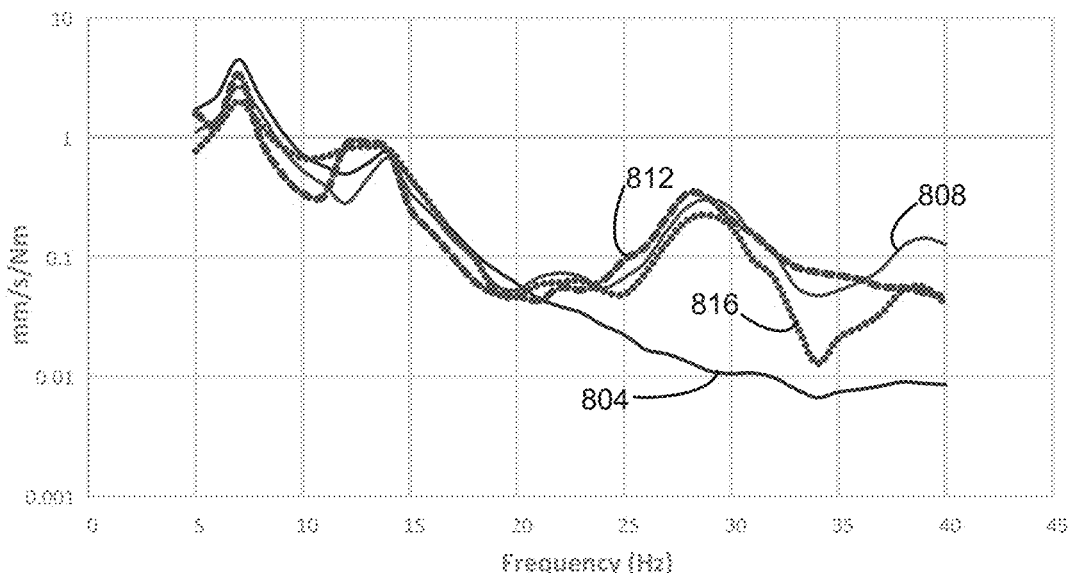
FIG. 8 is a graph of frequency response functions in an embodiment.

In some embodiments, multiple motors may not be completely out of phase or completely in phase with each other, but instead, have a phase difference that is dependent on the characteristics of the vehicle body and different locations of the motors. To provide an example of characteristics of a vehicle body, FIG. 8 illustrates graphs of vibration response for a given motor torque amplitude as a function of frequency used to illustrate a frequency response function (FRF). A seat X/Torque curve 804 provides a graph of seat vibration in the X direction for a unit torque oscillation versus frequency. A steering wheel X/Torque curve 808 provides a graph of steering wheel vibration in the X direction for a unit torque oscillation versus frequency. A steering wheel Y/Torque curve 812 provides a graph of steering wheel vibration in the Y direction for a unit torque oscillation versus frequency. A steering wheel Z/Torque curve 816 provides a graph of steering wheel vibration in the Z direction for a unit torque oscillation versus frequency. The peaks of the curves show the resonance frequencies at the corresponding location and directionality. The FRF is a function of the path (structure) connecting the source of vibration (the motor) and the receiver of the vibration (the driver/passenger interface). The FRF has both amplitude and phase, although FIG. 8 only shows the amplitude. The different motors in the same multi-motor vehicle will have different FRFs (both amplitude and phase) going to the receiver due to the motors being at different locations. To achieve perfect out-of-phase cancellation at the receiver, each source must be phased taking into consideration the impact of FRF phase lag instead of simply making two motors as being 180° out of phase from each other.

Figure 9A:
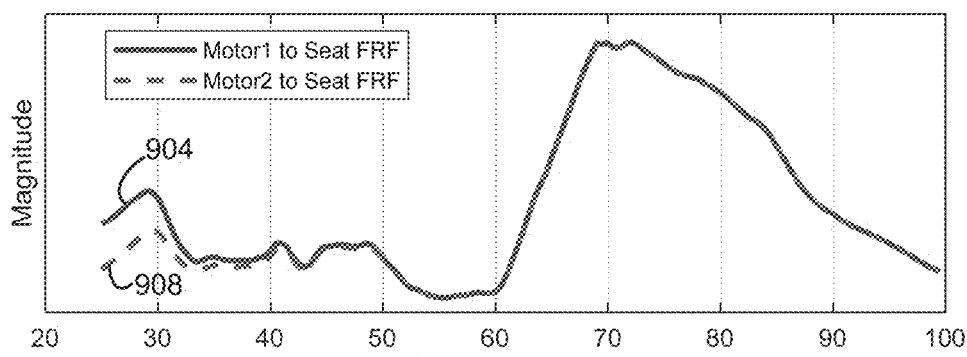
FIG. 9A and FIG. 9B are graphs of frequency response functions by different motors in an embodiment.
Figure 9B:
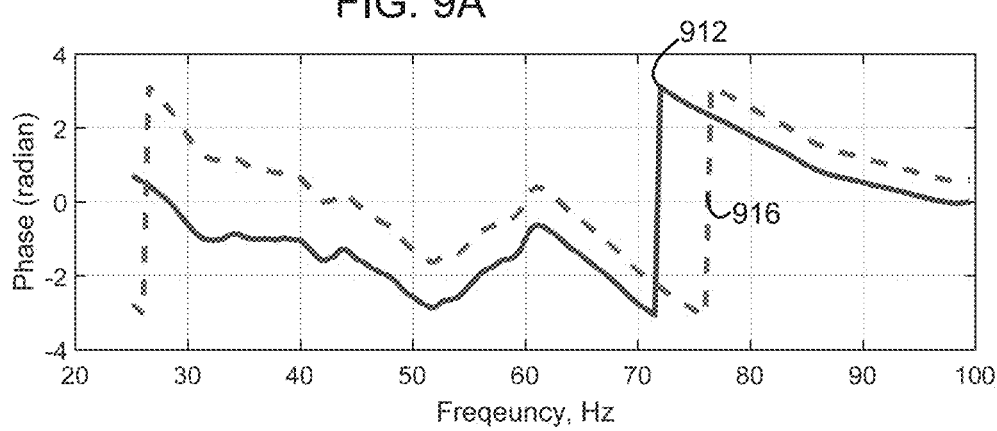

To provide a further illustration of the application, FIG. 9A illustrates graphs of the magnitude of the torque versus frequency used to illustrate FRFs. A Motor 1 curve 904 shows the magnitude of the vibration at the receiver (driver/ passenger interface) for a unit torque oscillation from Motor 1 as the source as a function of frequency. A Motor 2 curve 908 shows the magnitude of the vibration at the receiver (driver/passenger interface) for a unit torque oscillation from Motor 2 as the source as a function of frequency. FIG. 9B illustrates graphs of the phase (in radians) of the vibration for a unit torque oscillation versus frequency used to illustrate FRFs. A Motor 1 curve 912 shows the phase of the vibration at the receiver (driver/passenger interface) for a unit torque oscillation versus frequency from Motor 1 as the source. A Motor 2 curve 916 shows the phase of the vibration at the receiver (driver/passenger interface) for a unit torque oscillation versus frequency from Motor 2 as the source. FIGS. 9A and 9B illustrate that the phase at the receiver location can be different for different motors acting as the source. The illustrated FRFs are exemplary. In some embodiments, the FRF frequency range is in the range of 1 hertz (Hz) to thousands of Hz. For example, at about 50 Hz, the phase difference between Motor 1 and Motor 2 is about 1 radian, which is about 60 degrees. If Motor 1 and Motor 2 were run 180° out of phase, they would not cancel each other out, since there is a 60 degree phase lag between Motor 1 and Motor 2 experienced by the receiver. So at 50 Hz, instead of Motor 2 being pulsed 180° degrees out of phase with Motor 1, Motor 2 is instead pulsed at about 120° of lag with respect to Motor 1 in order to achieve the intended 180° (120°+60°) of phase difference between the two sources to provide an improved cancelation. A lookup table may be used to store the phase differences between motors at a receiver for different frequencies and other parameters.

In some embodiments, the FRFs are measured offline during the development of the vehicle, creating a phasing table that provides phasing as a function of frequency and possibly other factors. In some embodiments, the FRFs are measured offline so that the phasing is pre-calibrated to perfectly cancel out at a receiver, such as a driver. If there is more than one passenger, in some embodiments, the phasing may be pre-calibrated to minimize NVH at a particular receiver or may provide an average minimum NVH for all of the passengers. In some embodiments, using FRFs to minimize NVH for one passenger minimizes NVH for other passengers. In some embodiments, a controller would use the phasing table to determine the phasing between Motor 1 and Motor 2.

In some embodiments, the FRFs are measured online, so that phasing is calculated in real time by measuring phasing in each vehicle. For online measurements, a signal may be generated from the different motors and the phase lag at the receiver is measured. Whether initially measured online or offline, the FRFs can continue to be monitored and periodically recalibrated as needed to account for variations in the vehicle response over time or due to different loading conditions.

Figure 4:
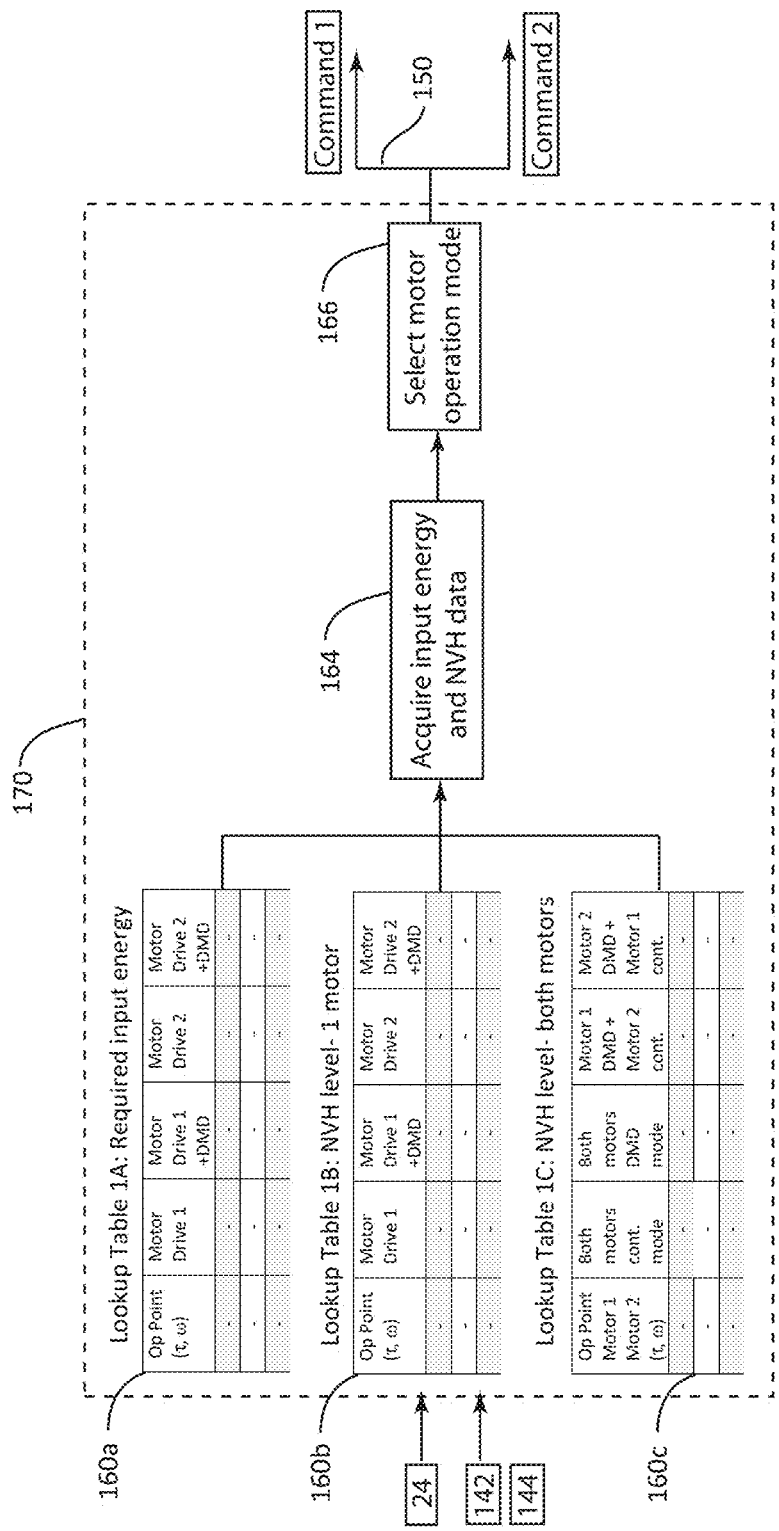
FIG. 4 is a detailed flow chart illustrating a dual-motor control scheme in accordance with an embodiment.

FIG. 4 shows a high-level flow chart illustrating a dual-motor control method 170 in accordance with an embodiment. Method 170 may be implemented within application programming 122 of system controller 110 (FIG. 2) for the operation of a dual-motor drive system, or at other controllers or logic devices within the drive system or vehicle. With the acquired input (e.g. one or more of the requested torque 24, or any of the other feedback data (e.g. motor speed 144, output torque 142, etc.)) a plurality of more lookup tables 160a, 160b, and 160c are applied to acquire information (step 164) of 1) required input energy and 2) a performance characteristic acceptability (in this example NVH). As shown in FIG. 4, Lookup Table 1A (160a) shows the required input energy over the whole operating range (Op point (torque ti from zero to requested torque and operating speed ω) for Motor drive 1 in continuous mode, Motor drive 1 with DMD, Motor drive 2 in continuous mode, and Motor drive 2 with DMD. Lookup Table 1B (160b) shows the NVH level information operating a single motor over the whole operating range (Op point (torque ti from zero to requested torque and operating speed ω) for Motor drive 1 in continuous mode, Motor drive 1 with DMD, Motor drive 2 in continuous mode, and Motor drive 2 with DMD. Lookup Table 1C (160c) shows the NVH level information over the whole operating range (Op point (torque ti from zero to requested torque and operating speed ω) for operating both motors for both motors in continuous mode, both motors in DMD mode, Motor drive 1 with DMD while Motor drive 2 running continuous, and Motor drive 2 with DMD while Motor drive 1 running continuous. For dual motor's torque split, any motor can contribute zero to requested torque to the axle, with or without DMD. Thus, lookup tables 160a, 160b, and 160c preferably comprise data ranging from zero to the requested torque level for both motor drives.

Next, at step 166, the desired motor operation combination is selected for the requested torque that consumes minimum input energy while maintaining an acceptable performance (e.g., NVH) level. This combination can be any motor alone in continuous mode, both motors in continuous mode, one motor in continuous mode and another motor in DMD mode, or both in DMD mode, or only one of them operating in DMD mode.

Once the operating mode is determined at step 166, control instructions or commands 150 (e.g. Command 1 for Motor 1 and Command 2 for Motor 2) are then sent to the respective power converter/inverter to operate the respective motor/motors in a continuous or pulsed manner according to the selected operating mode.

While FIG. 4 is shown detailed with a dual motor operation and with primary consideration of NVH level, it is appreciated that method 170 may be implemented for various operating mode scenarios for any number of machines/motors and corresponding characteristics and/or conditions, such as loss data, thermal data, etc.

Figure 5:
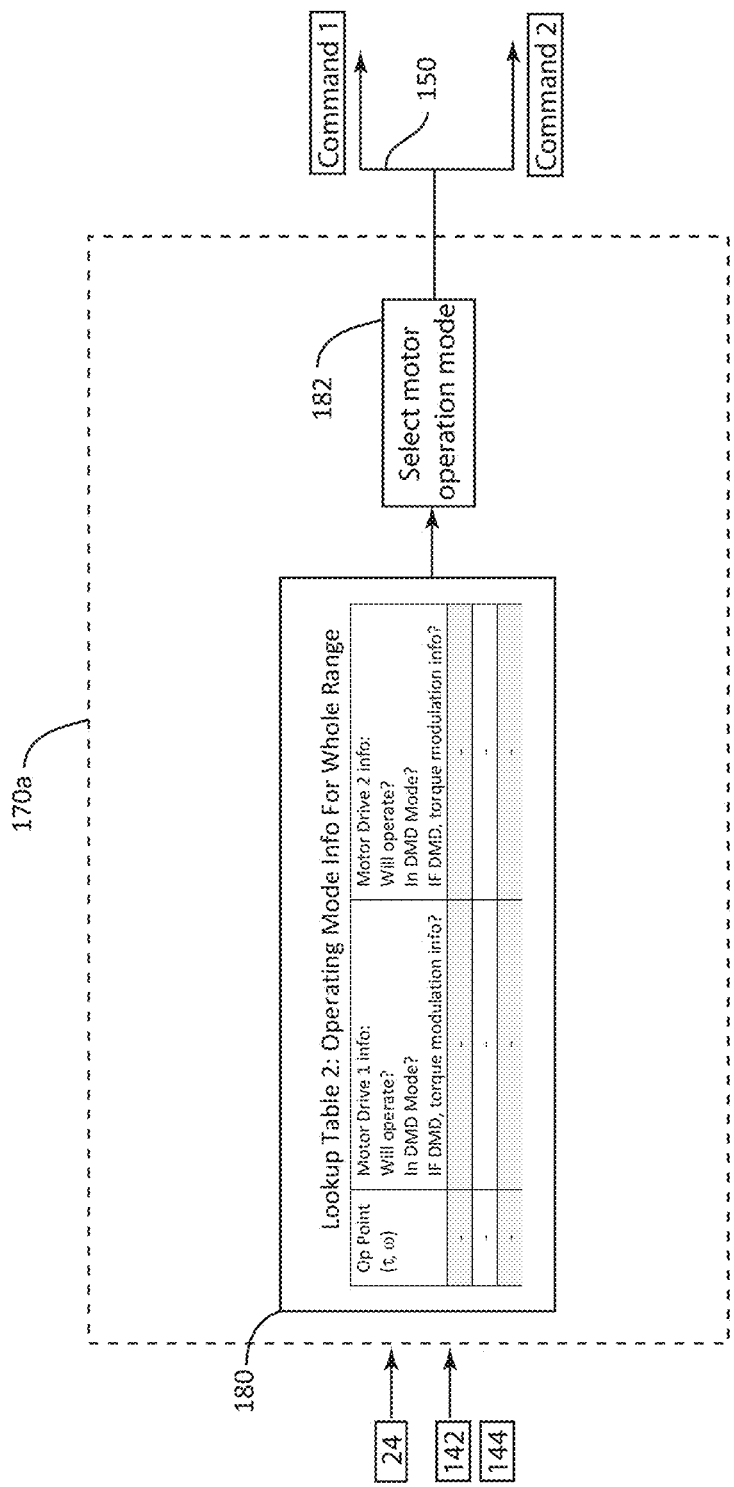
FIG. 5 is a detailed flow chart illustrating an alternative dual-motor control scheme in accordance with another embodiment.

FIG. 5 is a detailed flow chart illustrating an alternative dual-motor control method 170a in accordance with another embodiment. Method 170a may be implemented as application programming 122 of system controller 110 for the operation of a dual-motor drive system or at other controllers or logic devices within the drive system or vehicle. With the acquired input (e.g. one or more of the requested torque 24, or any of the other feedback data (e.g. motor speed 144, output torque 142, etc.)) a singular lookup table 180 is applied to acquire information of 1) required input energy and 2) a performance characteristic acceptability (in this example NVH). As shown in FIG. 5, Lookup Table 2 (180) shows the required input energy over the whole operating range (Op point (torque τ from zero to requested torque and operating speed ω) for Motor 1 and Motor 2. In this embodiment, Lookup Table 2 (180) includes characterization of the one or more motors (e.g. via empirical analysis, simulations, or other characterizations) such that the table will already have the information to select the motor operation mode or combination to arrive at a minimum total energy consumption while maintaining acceptable performance characteristics (e.g. NVH level, temperature balance, etc.). The selected combination or mode can be any motor alone in a continuous mode, both motors in a continuous mode, one motor in a continuous mode while another motor is in DMD mode, both motors in DMD mode, or only one of them operating in DMD mode, etc. In an embodiment using NVH levels, the NVH scenario for any motor operation combination for the whole operating range may be predetermined and implemented in Lookup Table 180. In a further embodiment, each of the motor drive info columns in Lookup Table 180 comprises values of the torque level of the motor at which a continuous operation mode is selected and the max-efficiency torque, torque modulation frequency, duty cycle, etc. at which DMD operation is selected for a motor or motor combination.

Next, at step 182, the desired motor operation combination is selected for the requested torque that consumes minimum input energy while maintaining an acceptable performance (e.g., NVH) level. This combination can be any motor alone in continuous mode, both motors in continuous mode, one motor in continuous mode and another motor in DMD mode, or both in DMD mode, or only one of them operating in DMD mode.

Once the operating mode is determined at step 182, control instructions or commands 150 (e.g. Command 1 for Motor 1 and Command 2 for Motor 2) are then sent to the respective power converter/inverter to operate the respective motor/motors in a continuous or pulsed manner according to the selected operating mode.

As explained above, one or more of the electric machines are driven in a pulsed manner when a desired output is less than a designated output level for a given motor speed and driven in a continuous manner when the desired motor output is greater than or equal to the designated output level.

With respect to pulsed operation in a multiple motor configuration as detailed in FIG. 2, the system controller 110 (and/or motor controllers 120a, 120b) will direct the inverters 103a, 130b to deliver power to one or more of the motors 140a, 140b in a pulsed manner During the "on" pulses, the inverters 103a, 130b are directed to deliver power at a preferred output level—which would typically (but not necessarily) be at or close to the maximum efficiency operating level for the current motor speed. During the "off" pulses, the motors 140a, 140b ideally output zero torque. In some embodiments, the timing of the pulsing is controlled by a separate pulse controller (not shown).

To facilitate pulsed operation, the system controller 110 determines the desired output level and the desired duty cycle for pulsed operation at the current motor speed (which is preferably at or close to the system's maximum efficiency energy conversion output level at the current motor speed— although other energy efficient levels can be used as appropriate). The controllers 120a, 120b then direct respective inverters 130a, 130b to implement the desired duty cycle at the designated power level. Conceptually, this may be accomplished by effectively turning the power supply on and off at a relatively high frequency such that the fraction of the time that power is supplied to the motor corresponds to the desired duty cycle, and the power level corresponds to the preferred output level. In some embodiments, the "off" portion of the duty cycle may be implemented by directing the controller/inverter to drive the motor to deliver zero torque.

The frequency at which the power is pulsed is preferably determined by the system controller 110 or another controller such as a pulse controller (not shown). In some embodiments, the pulsing frequency can be fixed for all operations of the motor, while in others it may vary based on operational conditions such as motor speed, torque requirements, etc. For example, in some embodiments, the pulsing frequency can be determined through the use of a look-up table. In such embodiments, the appropriate pulsing frequency for current motor operating conditions can be looked up using appropriate indices such as motor speed, torque requirement, etc. In other embodiments, the pulsing frequency is not necessarily fixed for any given operating conditions and may vary as dictated by any of the controllers 110, 120a, and 120b. This type of variation may be implemented using sigma delta conversion in the determination of the electric machine pulses as discussed in U.S. Pat. No. 10,742,155. In some specific embodiments, the pulsing frequency may vary proportionally as a function of motor speed, at least in some operating regions of the motor.

Once the desired duty cycle is determined, the duration and nature of the pulses used to drive the motor can be determined/generated in a wide variety of manners. One relatively simple approach is to use a pulse width modulation (PWM) controller as the pulse controller (not shown).

The pulsed power discussed and utilized herein is quite different. Specifically, inverters 130a, 130b (or power converter 30 in FIG. 1) are controlled to cyclically switch between producing a high efficiency torque output (e.g. the peak efficiency torque) and no torque in the electric machine. In an induction motor, this results in the magnetic flux linked with the motor windings effectively dropping to zero.

Although traditional pulse width modulation will work in many applications, a potential drawback is the possibility of the pulsing generating undesirable vibrations or noise as the motor and/or power supply are turned on and off. Steady state operation of the motor at the same pulse cycle for a period of time is particularly susceptible to generating such vibration. There are a number of ways to mitigate such risks including some that will be described in more detail below. Another approach is to add some dither to the commanded pulse cycle.

As suggested above, the period for each cycle during pulsed operation (or inversely the pulsing frequency) may vary widely based on the design needs and the nature of the controlled system ranging from microseconds to tenths of a second or longer. A variety of factors will influence the choice of the cycle period. These include factors such as the capabilities and characteristics of the motor, the transitory effects associated with switching, potential NVH concerns, the expected operational loads, etc. In general, the pulsing frequency selected for any particular application will involve a tradeoff including factors such as NVH considerations, required responsiveness of the electric machine, efficiency loss associated with pulsing, etc. For example, in some automotive applications, pulsing frequencies on the order of 10 Hz-1000 Hz are believed to work well.

In most of the examples set forth above, pulsing is accomplished by modulating the torque between a higher (energy efficient) torque output level and a zero torque output level. Although that is believed to be the preferred approach in most pulsed control applications, it is expected that there will be circumstances (e.g. specific machines/ machine operating regions) where it may be preferable to modulate between higher and lower, non-zero torque outputs rather than modulating between high and zero torque. For example, in some circumstances, High/Low pulsing may have better Noise, Vibration, and Harshness (NVH) characteristics than on/off pulsing and thus there may be circumstances where a more desirable tradeoff between energy conversion efficiency and NVH characteristics may be attained by high/low pulsing than by on/off pulsing. In another example, for some operating regions of some motors, a high/low pulsing approach may provide better overall energy conversion efficiency than on/off pulsing. Motors that incorporate permanent magnets that require field weakening to generate zero torque are particularly good candidates for the use of high-low torque modulation.

Most motors have a designated maximum rated output level. Generally, the maximum rated output level is based on steady state operation and often the motor can be driven at higher output levels for brief periods of time without any adverse effects. In some embodiments, in selected operating regions, the output level of the motor may be pulsed with the "on" levels being higher than the maximum rated continuous output level for steady state operation. For some motors in some potential operating ranges, there are several potential advantages to using overdrive pulses. For example, in some specific operating circumstances, the energy conversion efficiency of the motor or system (e.g., motor and inverter) at a given motor speed may be higher in certain overdrive regions than in "normal" operating regions, which means that pulsed operation at higher torque or power may be even more efficient.

Furthermore, more efficient operation typically leads to less heating, which potentially facilitates even higher net torque outputs. Thus, it is believed that if motors that are traditionally driven with continuous power (such as induction and other AC motors, brushless DC motors, switched reluctance motors, etc.) are designed with pulsed operation in mind, they can sometimes be optimized to attain higher net torque outputs using pulsed control than would be appropriate using more conventional steady/continuous drive power.

There are a variety of factors that contribute to maximizing motor efficiency. One contributor relates to the power factor which is the cosine of the angle between the rotating voltage and current vectors. Ideally, the voltage and current should be in phase or have a unity power factor. However, for many types of electric motors/generators, this ideal does not necessarily represent the highest system efficiency point for any given load and speed. When pulsed control of the motor as described herein is contemplated and the power factor correction is optimized taking into account the pulsed operating points, the effective power factor is expected to improve above that of traditional continuous motor operation.

Another factor that contributes to motor inefficiencies is sometimes referred to as resistive or $I^2R$ losses. Resistive losses heat the motor windings (not shown), which in turn further increases resistive losses since winding resistivity generally increases with temperature. Resistive losses are non-linear—increasing with at least the square of the current. Therefore, resistive losses tend to have a higher impact on the overall motor efficiency at higher motor output levels, such as the levels used during pulsed operation. A rule-of-thumb for electric motor design is that the magnetic losses should approximately equal the resistive losses at the target set point of operation. Using the pulsed motor control method described herein may influence the design of or choice of an appropriate motor since motor operating points below the most efficient operating point will generally not be used. In other words, the motor is driven either at substantially its most efficient operating point or at higher loads. Low load continuous operating need not be considered in the design or selection of the electric motor—which again can help further improve the system's overall efficiency.

Another factor that contributes to motor efficiency (or inefficiency) is sometimes referred to as magnetic core losses—which relates to magnetic flux oriented losses. One loss mechanism is motor winding leakage reactance, which refers to magnetic flux lines that do not link between rotor and stator magnetic elements. Another magnetic core loss mechanism relates to hysteresis within magnetic iron cores and is often represented in a BH curve. Here B is the magnetic flux density and H is the magnetic field strength. They are related by the magnetization of the materials thru which the field passes, which for some motors, is the iron core(s) present in the rotor or stator. Again, a motor that is designed specifically for pulsed control can be optimized to mitigate magnetic core losses during pulsed motor operation.

As discussed above, transient switching losses associated with switching between motor "on" and motor "off" states during pulsing is another factor that impacts the efficiency of the motor during pulsed operation. As discussed above, one way to reduce these transient switching losses is to improve (shorten) the motor drive current rise and fall times associated with pulsing the motor on and off. Another way to help manage the transient switching losses is to manage the frequency of the pulsing. In general, the lower the switching frequency, the lower the transient switching losses will be. However there is a tradeoff here in that lower frequency switching can sometimes induce noise, vibration, and harshness (NVH) that may be undesirable or unacceptable in certain applications. Thus, the pulsing frequency for any particular motor is preferably selected appropriately considering both motor efficiency and NVH concerns and/or requirements that are relevant to the motor's intended application(s). Along these lines, it is noted the pulsing controllers that have noise shaping capabilities such as sigma delta conversion based pulsing controllers can be very helpful at mitigating NVH impacts associated with pulsed motor control and can therefore be helpful in supporting the use of generally lower switching frequencies.

It should be appreciated that the appropriate pulsing (torque modulation) frequency for different motors may be very different based on the motor's construction, operating environment, and operational range. The most appropriate pulsing frequency for any particular motor will depend on a variety of factors including motor size, on/off transient characteristics, NVH considerations, etc.

The selection of the desired drive point for any particular motor speed can also have an impact on the pulsing frequency. More specifically, many motors have relatively flat efficiency curves over a relatively broad operational range. In general, pulsed operation at a torque level that is slightly lower than the optimal efficiency point of continuous operation can sometimes facilitate switching at a slightly lower frequency, which—depending on the nature of the switching losses—may result in a higher overall motor efficiency during pulsed operation. This emphasizes the point that the desired pulsed operation drive point associated with any particular motor speed is not necessarily the torque level that would be most efficient for continuous motor operation. Rather, in some circumstances, the most energy efficient point for pulsed operation may be slightly different than the most energy efficient point for continuous operation. Furthermore, NVH considerations and/or other operational or control considerations may affect the decision as to the drive point that is deemed appropriate for any particular motor speed.

It is appreciated that the above described multi-phase systems and methods may be equally beneficial in numerous vehicle and propulsion related applications, including electric motors used in other types of vehicles, including trucks, cars, carts, motorcycles, bicycles, drones, and other flying devices; in robots and other devices that move autonomously within an environment; etc. As such, the term "vehicle" should be broadly construed to include all of the above and any other type of motorized moving assembly whether known now or developed in the future.

Motors used in appliances such as washing machines, dryers, heating, ventilation, and air conditioning (HVAC) applications may provide additional examples of applications that can benefit from multiple electric machine systems with pulsed control.

Although only a few embodiments of the present technology have been described in detail, it should be appreciated that the present technology may be implemented in many other forms without departing from the spirit or scope of the present technology. The various described multi-machine controllers and associated machine elements may be implemented, grouped, and configured in a wide variety of different architectures in different embodiments. For example, in some embodiments, the controller may be incorporated into a motor controller or an inverter controller or it may be provided as a separate component. Similarly, for a generator, the controller may be incorporated into a generator controller or a rectifier controller and in combined motor/generators the controller may be incorporated into a combined motor/generator controller or a combined inverter/rectifier controller. In some embodiments, the described control functionality may be implemented algorithmically in software or firmware executed on a processor—which may take any suitable form, including, for example, general purpose processors and microprocessors, digital signal processors, etc.

The system and/or motor controllers may be part of a larger control system. For example, in vehicular applications, the described control may be part of a vehicle controller, a powertrain controller, a hybrid powertrain controller, or an ECU (engine control unit), etc. that performs a variety of functions related to vehicle control. In such applications, the vehicle or other relevant controller, etc. may take the form of a single processor that executes all of the required control, or it may include multiple processors that are co-located as part of a powertrain or vehicle control module or that are distributed at various locations within the vehicle. The specific functionalities performed by any one of the processors or control units may be widely varied.

Generally, the schemes for multi-phase motor control may be implemented digitally, algorithmically, using analog components, or using hybrid approaches. The motor controller may be implemented as code executing on a processor, on programmable logic such as an FPGA (field programmable gate array), in circuitry such as an ASIC (application specific integrated circuit), on a digital signal processor (DSP), using analog components, or any other suitable piece of hardware. In some implementations, the described control schemes may be incorporated into object code to be executed on a digital signal processor (DSP) incorporated into an inverter controller (and/or rectifier controller in the context of a generator and/or a combined inverter/rectifier controller).

Therefore, the present embodiments should be considered illustrative and not restrictive and the present technology is not to be limited to the details given herein but may be modified within the scope and equivalents of the appended claims.

What is claimed is:

1. A multiple electric machine system for use in a vehicle, the electric machine system comprising:
    a first electric machine;
    a second electric machine;
    one or more power converters coupled to the first electric machine and second electric machine; and
    a controller coupled to the one or more power converters and arranged to receive one or more inputs relating to the system, wherein the controller, in response to the one or more inputs, is configured to:
        direct the one or more power converters in a first operating mode to cause both the first electric machine and the second electric machine to continuously output torque;
        direct the one or more power converters in a second operating mode to cause the first electric machine to provide a pulsed torque output and the second electric machine to continuously output torque;
        direct the one or more power converters in a third operating mode to cause both the first electric machine and the second electric machine to provided pulsed torque outputs, wherein at least sometimes during operation in the third operating mode, a timing of pulsing of the first electric machine is coordinated to be out of phase with pulsing of the second electric machine by a first phase delay to cause vibrations generated by pulsing of the first and second electric machines to be out of phase at a target location in the vehicle by a second phase delay to reduce noise, vibration and harshness (NVH) at the target location in the vehicle; and
        wherein during each of the pulsed torque outputs, the controller causes the corresponding one of the first electric machine and second electric machine to alternate between an associated first output torque level and a zero output torque level.

2. The multiple electric machine system as recited in claim 1, wherein during the pulsed torque output of the first electric machine, the controller turns off power to a selected one of the one or more power converters that provides power to the first electric machine during at least portions of periods when the first electric machine is outputting at the zero output torque level.

3. The multiple electric machine system as recited in claim 1, wherein the controller selects between the first, second, and third operating modes to optimize an energy conversion efficiency of the multiple electric machine system.

4. The multiple electric machine system as recited in claim 1, wherein the controller selects between the first, second and third operating modes as a function of an input in a form of one or more of an operating speed or requested torque related to the system.

5. The multiple electric machine system as recited in claim 1, wherein the controller selects between the first, second, and third operating modes based at least in part on a performance characteristic of the first and second electric machines, the performance characteristic comprising one of:
    (i) projected NVH levels associated with the first, second and third operating modes;
    (ii) thermal balancing; and
    (iii) total losses of the first and second electric machines.

6. The multiple electric machine system as recited in claim 1, wherein the first electric machine and the second electric machine are each multi-phase AC electric machines.

7. The multiple electric machine system as recited in claim 1, wherein the first and second electric machines comprise motors and the one or more power converters includes an inverter.

8. The multiple electric machine system as recited in claim 1, wherein the multiple electric machine system is configured to operate as a motor/generator.

9. The multiple electric machine system as recited in claim 1, wherein the controller is configured to direct the one or more power converters in a fourth operating mode to cause a continuous torque output of the first electric machine and a pulsed torque output of the second electric machine.

10. A controller for controlling a multiple electric machine system in a vehicle, the multiple electric machine system including a first electric machine and a second electric machine, the controller configured to:
   receive one or more inputs relating to the multiple electric machine system; and
   in response to the one or more inputs, cause one or more of the first electric machine and the second electric machine to variably alternate between operating modes in which torque outputs of the one or more of the first electric machine and a second electric machine are pulsed or continuous wherein,
   (i) in a first operating mode both the first electric machine and the second electric machine each have continuous torque outputs,
   (ii) in a second operating mode the torque output of the first electric machine is pulsed, and the torque output of the second electric machine is continuous,
   (iii) in a third operating mode the torque output of the first electric machine is continuous, and the torque output of the second electric machine is pulsed, and
   (iv) in a fourth operating mode the torque outputs of both the first electric machine and the second electric machine are pulsed, wherein at least sometimes during operation in the fourth operating mode, a timing of pulsing of the first electric machine is coordinated to be out of phase with pulsing of the second electric machine by a first phase delay to cause vibrations generated by pulsing of the first and second electric machines to be out of phase at a target location in the vehicle by a second phase delay to reduce noise, vibration and harshness (NVH) at the target location in the vehicle; and
   wherein when the torque output of a selected one of the electric machines is pulsed, the torque output of the selected electric machine alternates between a first output torque level and a second output torque level that is zero.

11. The multiple electric machine system, as recited in claim 1, wherein during each of the pulsed torque outputs of the first and second electric machines, the torque output or the respective electric machine is pulsed at an associated pulsing frequency in the range of 10 Hz to 1000 Hz.

12. The controller as recited in claim 10, the multiple electric machine system further comprising a third electric machine, the controller configured to:
   in response to the one or more inputs, cause one or more of the first electric machine, second electric machine, and third electric machine to variably alternate between operating modes in which outputs of the one or more of the first electric machine, the second electric machine and the third electric machine are pulsed or continuous.

13. The controller as recited in claim 10, wherein the controller selects between the first, second, third, and fourth operating modes to optimize an energy conversion efficiency of the multiple electric machine system.

14. The controller as recited in claim 10, wherein the controller selects between the first, second, third, and fourth operating modes as a function of an input in a form of one or more of an operating speed or requested torque related to the system.

15. The controller as recited in claim 10, wherein the controller selects between the first, second, third, and fourth operating modes based, at least in part, on a performance characteristic of the first and second electric machines, the performance characteristic comprising one of:
   (i) projected NVH levels associated with the first, second, third and fourth operating modes;
   (ii) thermal balancing; and
   (iii) total losses of the first and second electric machines.

16. The controller as recited in claim 10, wherein the first electric machine and the second electric machine are each multi-phase AC electric machines.

17. A method for controlling a multiple electric machine system in a vehicle, the multiple electric machine system including a first electric machine and a second electric machine, the method comprising:
   receiving one or more inputs relating to the multiple electric machine system; and
   in response to the one or more inputs, causing one or more of the first electric machine and a second electric machine to variably alternate between operating modes in which torque outputs of the one or more of the first electric machine and a second electric machine are pulsed or continuous, wherein,
   (i) in a first operating mode both the first electric machine and the second electric machine each have continuous torque outputs,
   (ii) in a second operating mode the torque output of the first electric machine is pulsed, and the torque output of the second electric machine is continuous,
   (iii) in a third operating mode the torque output of the first electric machine is continuous, and the torque output of the second electric machine is pulsed, and
   (iv) in a fourth operating mode the torque outputs of both the first electric machine and the second electric machine are pulsed, wherein at least sometimes during operation in the fourth operating mode, a timing of pulsing of the first electric machine is coordinated to be out of phase with pulsing of the second electric machine by a first phase delay to cause vibrations generated by pulsing of the first and second electric machines to be out of phase at a target location in the vehicle by a second phase delay to reduce noise, vibration and harshness (NVH) at the target location in the vehicle; and
   wherein when the torque output of a selected one of the electric machines is pulsed, the torque output of the selected electric machine alternates between a first torque output level and a second torque output level that is lower than the first torque output level, the second torque output level being zero.

18. The method as recited in claim 17, the multiple electric machine system further comprising a third electric machine, the method further comprising:
   in response to the one or more inputs, causing the third electric machine to variably alternate between operating modes in which outputs of the third electric machine are pulsed or continuous.

19. The method as recited in claim 17, wherein selecting between the first, second, third, and fourth operating modes is performed to optimize an energy conversion efficiency of the multiple electric machine system.

20. The method as recited in claim 17, wherein selecting between the first, second, third, and fourth operating modes is performed as a function of input in a form of one or more of an operating speed or requested torque related to the system.

21. The method as recited in claim 17, wherein selecting between the first, second, third, and fourth operating modes is based, at least in part, on a performance characteristic of the first and second electric machines, the performance characteristic comprising one of:
(i) projected NVH levels associated with the first, second, third and fourth operating modes;
(ii) thermal balancing; and
(iii) total losses of the first and second electric machines.

22. The method as recited in claim 17, wherein the first electric machine and the second electric machine are each multi-phase AC electric machines.

23. A controller for controlling a multiple electric machine system used in a vehicle, the multiple electric machine system including a first electric machine and a second electric machine, the controller configured to:
receive one or more inputs relating to the multiple electric machine system; and
in response to the one or more inputs, cause the first electric machine and the second electric machine to operate in a pulsed operating mode in which torque outputs of the first electric machine and a second electric machine alternate between a first torque output level and a second torque output level that is lower than the first torque output level, the second output torque level being zero; and
wherein a timing of pulsing the first electric machine is coordinated to be out of phase with pulsing of the second electric machine by a first phase delay to cause vibrations generated by pulsing of the first and second electric machines to be out of phase at a target location in the vehicle by a second phase delay so as to minimize noise, vibration, and harshness induced by the multiple electric machine system at the target location in the vehicle.

24. The controller as recited in claim 23, wherein the first electric machine and the second electric machine are each multi-phase AC electric machines.

25. The controller as recited in claim 23 further comprising a third electric machine:
wherein pulsing of the third electric machine is timed to be out of phase with pulsing of one or more of the first electric machine and second electric machine.

26. The controller as recited in claim 25:
wherein the first electric machine, second electric machine, and third electric machine are pulsed at a first frequency; and
wherein pulsing of the first electric machine, second electric machine, and third electric machine is timed to minimize noise, vibration, and harshness at the target location.

27. The controller as recited in claim 25 further comprising a fourth electric machine:
wherein pulsing of the fourth electric machine is timed to be out of phase with pulsing of one or more of the first electric machine, second electric machine, and third electric machine.

28. The controller as recited in claim 27:
wherein the first electric machine, second electric machine, third electric, and fourth electric machine are pulsed at a first frequency; and
wherein pulsing of the first electric machine, second electric machine, third electric machine, and fourth electric machine are timed to minimize noise, vibration, and harshness of the multiple electric machine system at the target location.

29. The controller as recited in claim 23, wherein the controller is configured to:
in response to the one or more inputs, cause one or more of the first electric machine and the second electric machine to variably alternate between operating modes in which torque outputs of the one or more of the first electric machine and a second electric machine are pulsed or continuous.

* * * * *